United States Patent
Wang et al.

(10) Patent No.: US 7,076,361 B2
(45) Date of Patent: Jul. 11, 2006

(54) ENGINE CRANKSHAFT POSITION RECOGNITION AND TRACKING METHOD APPLICABLE TO CAM AND CRANKSHAFT SIGNALS WITH ARBITRARY PATTERNS

(75) Inventors: Junmin Wang, Helotes, TX (US); Jayant V. Sarlashkar, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 0 days.

(21) Appl. No.: 11/092,417

(22) Filed: Mar. 29, 2005

(65) Prior Publication Data

US 2005/0223787 A1  Oct. 13, 2005

Related U.S. Application Data

(60) Provisional application No. 60/557,208, filed on Mar. 29, 2004.

(51) Int. Cl.
*G06F 19/00* (2006.01)
(52) U.S. Cl. .......................... 701/115; 702/33; 702/150
(58) Field of Classification Search ................ 701/115, 701/116; 702/33, 79, 150, 151, 176, 182, 702/184, 189
See application file for complete search history.

(56) References Cited

U.S. PATENT DOCUMENTS

| | | | |
|---|---|---|---|
| 5,201,296 A | 4/1993 | Wunning et al. | 123/479 |
| 5,359,883 A | 11/1994 | Baldwin et al. | 73/117.3 |
| 5,522,352 A * | 6/1996 | Adachi et al. | 123/90.15 |
| 5,548,995 A * | 8/1996 | Clinton et al. | 73/116 |
| 5,680,843 A | 10/1997 | Bacon, Jr. et al. | 123/406.62 |
| 5,699,769 A * | 12/1997 | Uchinami et al. | 123/406.58 |
| 6,536,389 B1 | 3/2003 | Shelby et al. | 123/90.15 |
| 6,647,335 B1 | 11/2003 | Jankovic et al. | 701/102 |
| 6,650,992 B1 | 11/2003 | Jankovic et al. | 701/111 |
| 6,681,173 B1 | 1/2004 | Turner et al. | 701/113 |
| 2003/0019284 A1 | 1/2003 | Koo et al. | 73/117.3 |
| 2003/0037607 A1 | 2/2003 | Minich et al. | 73/117.3 |
| 2003/0192495 A1 | 10/2003 | Hagner et al. | 123/90.17 |
| 2005/0278109 A1* | 12/2005 | Ando | 701/112 |

* cited by examiner

*Primary Examiner*—John T. Kwon
(74) *Attorney, Agent, or Firm*—Baker Botts, L.L.P.

(57) ABSTRACT

A method and system for providing data representing crankshaft position. For each rising edge of the crankshaft signal, a position value and a factor value are stored in a look-up table. Cam and crankshaft signals are used to locate an initial crankshaft position. This initial position value is used as a pointer to the look-up table, and incremented with each rising pulse of the crankshaft signal. Data from the table is used to extrapolate crankshaft position from crankshaft signal values to a desired resolution in degree angle units.

20 Claims, 3 Drawing Sheets

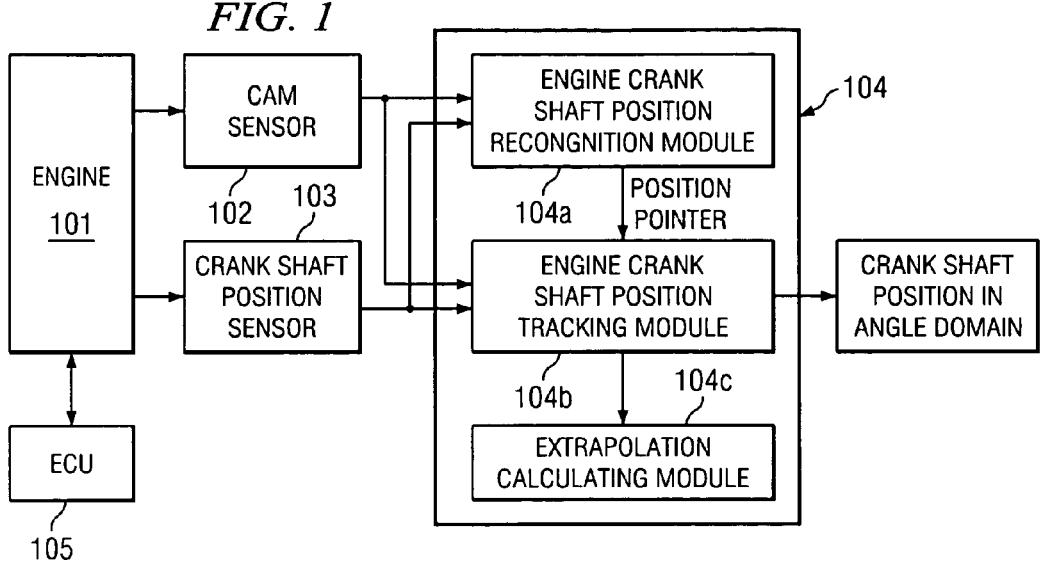
FIG. 1
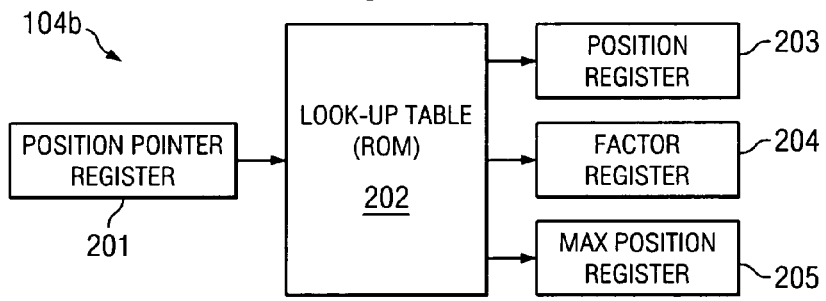
FIG. 2A
FIG. 2B
| POSITION POINTER | 0 | 1 | 2 | 3 | · · · | m-1 | m |
|---|---|---|---|---|---|---|---|
| POSITION | $Pos_0$ | $Pos_1$ | $Pos_2$ | $Pos_3$ | · · · | $Pos_{m-1}$ | $Pos_m$ |
| FACTOR | $Fac_0$ | $Fac_1$ | $Fac_2$ | $Fac_3$ | · · · | $Fac_{m-1}$ | $Fac_m$ |
| MAX POSITION | $EPos_0$ | $EPos_1$ | $EPos_2$ | $EPos_3$ | · · · | $EPos_{m-1}$ | $EPos_m$ |

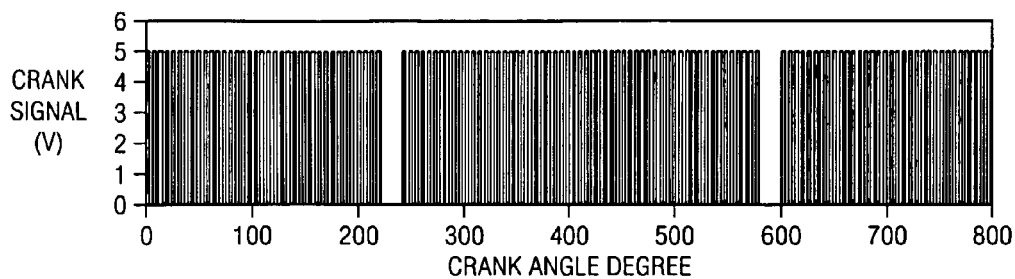
FIG. 4B
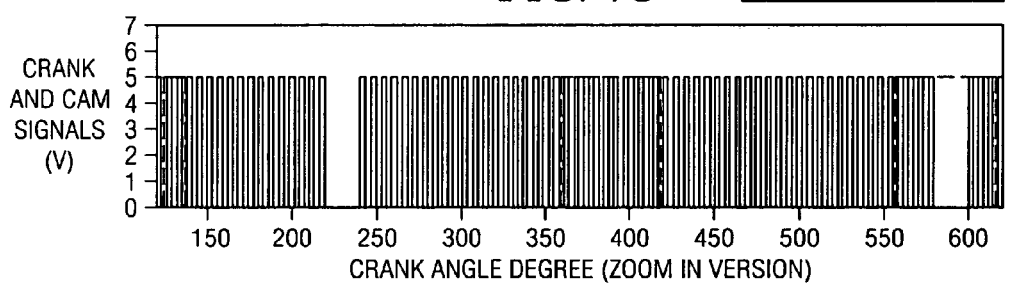
FIG. 4C
FIG. 5
| POSITION POINTER | ... | 96 | 97 | 98 | 99 | 100 | 101 | 102 | 103 | ... |
|---|---|---|---|---|---|---|---|---|---|---|
| POSITION | ... | 1488 (558°) | 1504 (564°) | 1520 (570°) | 1536 (576°) | 1600 (600°) | 1616 (606°) | 1632 (612°) | 1648 (618°) | ... |
| FACTOR | ... | 1 | 1 | 1 | 4 | 1/4 | 1 | 1 | 1 | ... |
| MAX POSITION | ... | 1503 | 1519 | 1535 | 1599 | 1615 | 1631 | 1647 | 1663 | ... |

ENGINE CRANKSHAFT POSITION RECOGNITION AND TRACKING METHOD APPLICABLE TO CAM AND CRANKSHAFT SIGNALS WITH ARBITRARY PATTERNS

RELATED PATENT APPLICATION

This application claims the benefit of U.S. Provisional Patent Application Ser. No. 60/557,208 entitled "Engine Crank Shaft Position Recognition and Tracking Method Applicable to Cam and Crank Position Signals with Arbitrary Patterns" filed Mar. 29, 2004.

TECHNICAL FIELD OF THE INVENTION

This invention relates to engine control systems, and more particularly to recognition and tracking of engine crankshaft position.

BACKGROUND OF THE INVENTION

Engine crankshaft position recognition and tracking is an important part of measurement of engine operating conditions. Today's engine control units (ECUs) rely upon real time measurements of crankshaft position for various engine crankshaft-sensitive functions, such as ignition, injection, cylinder cut, engine speed measurement, injection and ignition timing measurements.

To perform precise engine control, crankshaft position-sensitive commands need to be synchronized with the crankshaft position in angle domain. Therefore, the ECU must recognize and track the position of the crankshaft in the angle domain in real-time.

A combination of cam signals and crankshaft signals is used to recognize and track the engine crankshaft position. Engine and vehicle manufacturers have invented various cam and crankshaft signal patterns. These patterns are designed to allow the ECU to recognize the crankshaft position quickly once the crankshaft is rotated by the starter, as well as to track the crankshaft position accurately while the engine is running.

BRIEF DESCRIPTION OF THE DRAWINGS

FIG. 1 illustrates a computer-implemented system for engine crankshaft position and tracking in accordance with the invention.

FIG. 2A illustrates the operation of, and one embodiment of the hardware for the crankshaft position tracking module of FIG. 1.

FIG. 2B illustrates the contents of the look-up table of FIG. 2A.

FIGS. 4A–4C illustrate examples of engine cam and crankshaft position sensor signals.

FIG. 5 illustrates a partial look-up table for the cam and crankshaft signal patterns of FIG. 4.

DETAILED DESCRIPTION OF THE INVENTION

Figure 3:
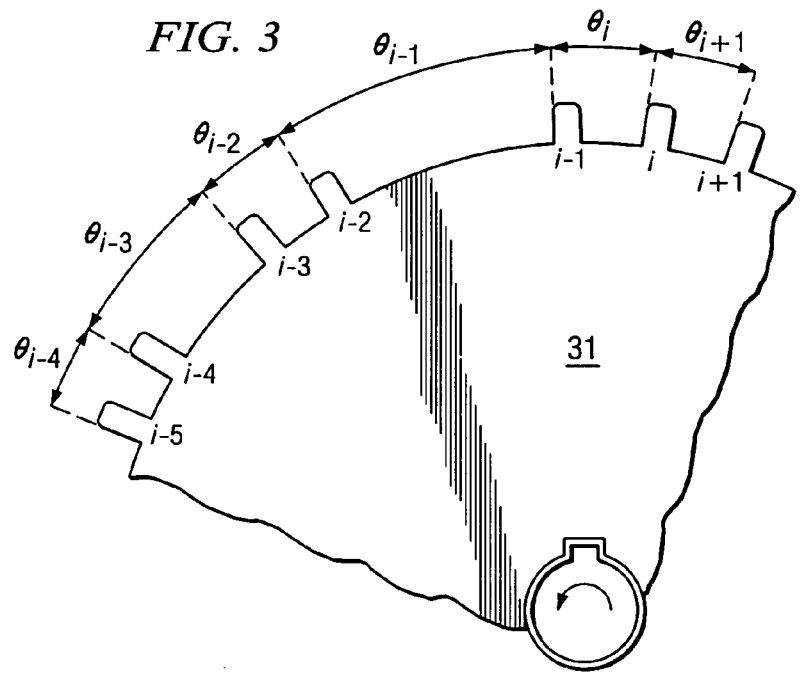
FIG. 3 illustrates a portion of an engine crankshaft position tooth wheel.

The following description is directed to a method and system for engine crankshaft position recognition and tracking. The system and method are capable of recognizing the crankshaft position in less than one engine cycle. As a result, the ECU may begin control of tasks such as injections and ignitions within one engine cycle.

The method (and its hardware implementations) provide a "generic" measurement of crankshaft position, in the sense that the input cam and crankshaft signal position signal patterns may be arbitrary. Engine control systems are easily prototyped because the method can be easily modified for any cam and crankshaft position signal pattern. Applications of the method include engine and vehicle control, and engine and vehicle benchmarking.

FIG. 1 illustrates an engine crankshaft position recognition and tracking system 100 in accordance with the invention. Engine 101 is assumed to have cam and crankshaft position sensors 102 and 103, which may be conventional engine sensor devices. As explained below, sensors 102 and 103 provide signal patterns, which may vary from engine to engine.

The engine cam and crankshaft position sensor signals may be conditioned as standard transistor-transistor logic (TTL) signals. Their rising edges and falling edges may be captured by integrated circuit chips such as field programmable gate arrays (FPGA), which may be used to implement processing modules 104a, 104b, and/or 104c.

Position recognition and tracking processing module 104 may be implemented with commercially available processing and memory devices. Module 104 may be implemented with hardware, software, firmware, or a combination thereof, to perform the method described herein. Memory storage may be implemented with devices such as read only memory (ROM) devices. For purposes of this description, a "processor" may range from a simple device capable of at least accessing and manipulating stored data to a more complex software-programmable device. As is evident from the description here, the tasks performed by modules 104a and 104b are not particularly complex, whereas module 104c does perform arithmetic calculations.

More specifically, module 104 performs various algorithms and calculations for crankshaft position recognition and tracking. Module 104 may be integrated into the processing system that implements ECU 105, or it may be a separate unit in data communication with ECU 105. Either way, module 104 provides ECU 105 with data representing crankshaft shaft position in angle domain.

The method implemented by system 100 can be divided into three main parts: crankshaft position recognition, crankshaft position tracking, and position extrapolation.

Crankshaft Position Recognition

Once the crankshaft is rotated by the starter of engine 101, ECU 105 needs to recognize the engine crankshaft position as soon as possible. Module 104 receives the cam and crankshaft signals from sensors 102 and 103 for this purpose. For purposes of this description, the position signals from the cam and crankshaft sensors 102 and 103 are referred to as the "cam signal" and "crankshaft signal", respectively.

The following steps describe the engine crankshaft position recognition process performed by module 104a. The various counters and registers referred to below are part of module 104a.

1) At the first detected rising edge of the cam signal, a crankshaft counter is cleared and enabled.
2) The crankshaft counter is increased by one once a rising edge of the crankshaft signal is captured.
3) Continue to increase the crankshaft counter until the falling edge of the cam signal is detected, and then stop the counting of the crankshaft counter.

4) At the falling edge of the cam signal, based on the value of the crankshaft counter, initialize a "position pointer" register to a corresponding value.

5) At the following rising edge of the crankshaft signal, store the position value obtained from the look-up table in crankshaft position register.

An example of obtaining an crankshaft position value in this manner is described below in connection with FIGS. 4A, 4B, 4C, and 5. As explained below in connection with FIGS. 2A and 2B, the position pointer is used to access a look-up table, thereby finding a position value at each rising edge of the crankshaft signal. Each position value is associated with a crankshaft position in angle domain. If a resolution greater than that provided by the pulse width of the crankshaft signal is desired, an extrapolation unit 104c is used to calculate position values between rising edges of the crankshaft signal.

In case of some patterns where the rising and falling edges of the cam signal occur at exactly the same time as the rising edge of the crankshaft signal, the cam signal may be delayed by few clock cycles or synchronized with the falling edge of the crankshaft signal, to make them occur at different times. This will not affect crankshaft position tracking because the cam signal is a relative reference to the crankshaft position.

If the cam signal has more than one pulse in one engine cycle, then the rising and falling edges of the cam signal will be detected in less than one engine cycle, and therefore, the crankshaft position can be recognized in less than one engine cycle.

It should be understood that although the above steps refer the rising edge of the crankshaft signal, the falling edge could be alternatively be used. The terms "rising edge" and "falling edge" are deemed equivalent herein for purposes of describing alternative methods of position recognition and tracking.

Also, in the case of some patterns where the number of the rising edges of the crankshaft signal under two or more cam signal pulses is the same, the number of the crankshaft signal rising edges between two adjacent rising edges of the cam signal can be used to differentiate the cam signals, assuming the combination of the cam and crankshaft signals is unsymmetrical.

Crankshaft Position Tracking

In addition to the engine crankshaft position data provided by module 104a, ECU 105 must have tracking data representing the crankshaft position in real-time in order to command various engine operations that are synchronized with the crankshaft position.

FIGS. 2A and 2B illustrate the crankshaft position tracking module 104b, which is based on use of a look-up table. FIG. 2A illustrates the input and outputs of module 104b, and FIG. 2B illustrates the contents of the look-up table 202 of FIG. 2A.

Look-up table 202 may be implemented with a read-only memory (ROM) device. The index to look-up table 202 is the position pointer stored in register 201, determined by module 104a. More specifically, module 104a communicates data representing the pointer via register 201 to module 104b. Once the position pointer is thereby initialized, it is increased by one at each rising edge of the crankshaft signal.

The output registers from look-up table 202 store data representing the following: the corresponding position at each rising edge of the crankshaft signal, the factor between the previous period and the coming period of the crankshaft signal based on its pattern, and the maximum extrapolated position during the coming period (right before the coming rising edge of the crankshaft signal) according to the position tracking resolution.

The table index (the position pointer) has values from 0 to m. Values of m represent a count of the number of crankshaft signal rising edges per engine cycle minus one. As the engine crankshaft rotates, the value of the position pointer circulates from 0 to m.

The position value, $Pos_i$ (i=0, 1, ..., m), is the crankshaft position value at each rising edge of the crankshaft signal. The factor value, $Fac_i$, is the ratio between the degree period of the $(i-1)^{th}$, $i^{th}$ rising edges and the period of the $i^{th}$, $(i+1)^{th}$ rising edges. This ratio is determined by the mechanical pattern of the crankshaft signal trigger tooth wheel.

Once the position pointer register 201 is updated, the values of the position, factor, and maximum extrapolated position registers 203,204,205 are updated immediately and simultaneously.

FIG. 3 illustrates an example of a portion of an engine crankshaft position mechanical tooth wheel 31. It is assumed that the mechanical tooth width is same for all teeth, and that the crankshaft signal rising and falling edges happen at the rising and falling edges of the mechanical teeth, respectively.

The crankshaft angle degree distances between each two adjacent rising edges have the following relationships:

$$\theta_{i-4}=\theta_{i-2}=\theta_i=\theta_{i+1},$$

$$\theta_{i-3}=2\,\theta_{i-4},$$

$$\theta_{i-1}=3\,\theta_{i-4} \quad\quad (1)$$

From the mechanical pattern, the factor value at each rising edge can be determined as follows:

$$Fac_{i-4} = \frac{\theta_{i-3}}{\theta_{i-4}} = \frac{2}{1}, \quad\quad (2)$$

$$Fac_{i-3} = \frac{\theta_{i-2}}{\theta_{i-3}} = \frac{1}{2},$$

$$Fac_{i-2} = \frac{\theta_{i-1}}{\theta_{i-2}} = \frac{3}{1},$$

$$Fac_{i-1} = \frac{\theta_i}{\theta_{i-1}} = \frac{1}{3},$$

$$Fac_i = \frac{\theta_{i+1}}{\theta_i} = \frac{1}{1},$$

These factor values are determined by only the mechanical crankshaft tooth wheel pattern. For the same type of engines, the mechanical tooth wheel patterns are the same, and therefore, the factor values are the same. The values of $Fac_{i-5}$ and $Fac_{i+1}$ depend on $\theta_{i-5}$ and $\theta_{i+2}$, respectively, which are not shown in FIG. 3.

Look-up table 202 separately stores the numerator and denominator of the factor value. The upper half bits of the cell are used to store the numerator and the lower half bits of the cell are used to store the denominator.

Crankshaft Position Extrapolation

For production engines, the numbers of the crankshaft trigger signals per engine cycle are usually very limited. Typically, they only have about 2×(60−2)=116 or 2×(60−3)=114 signals per engine cycle (720 crankshaft angle degrees). As a result, the resolution is about 6 crankshaft angle degrees.

However, in order to achieve optimal engine performance, for some engine operations a smaller resolution may be desired. For example, injection and ignition timings and durations need more precise control in crankshaft position angle domain. For such tasks, a desired resolution could be as small as one crankshaft angle degree or less.

This small resolution requirement calls for extrapolation of the crankshaft position provided by module 104b. In the example of FIG. 1, the extrapolation is performed by module 104c. The extrapolation is based on the measured previous time periods between two successive trigger signals. The factor values described above are used for the extrapolation of the crankshaft position, based on numerical extrapolation algorithms.

At steady state (constant engine speed), the periods between two adjacent rising edges of the crankshaft signal have the following relationship, based on the factor values defined by the pattern of the mechanical tooth wheel:

$$Period_{i+1} = Fac_i \times Period_i \quad (3)$$
$$= Fac_i \times Fac_{i-1} \times Period_{i-1}$$
$$= Fac_i \times Fac_{i-1} \times Fac_{i-2} \times Period_{i-2}$$
$$= \ldots$$

However, during transient states (engine accelerations or decelerations), the measured previous periods should be considered, so as to predict the coming period at each rising edge of the crankshaft signal as follows:

$$PredictedPeriod_{i+1} = a_0 \times Fac_i \times Period_i + a_1 \times Fac_i \times Fac_{i-1} \times Period_{i-1} + a_2 \times Fac_i \times Fac_{i-1} \times Fac_{i-2} \times Period_{i-2} + \ldots + a_n \times Fac_i \times Fac_{i-1} \times Fac_{i-2} \times \ldots \times Fac_{i-n} \times Period_{i-n} \quad (4),$$

where n is the order of the estimation. Values of $a_0$, $a_1$, $a_2$, ..., $a_n$ are the coefficients determined by the numerical algorithm. Values of $Fac_i$, $Fac_{i-1}$, ..., $Fac_{i-n}$ are provided by look-up table 202 at the previous rising edges and stored in the corresponding registers. Values of $Period_i$, $Period_{i-1}$, ..., $Period_{i-n}$ are the previously measured periods and stored in the corresponding registers.

Thus, at the $i^{th}$ rising edge of the crankshaft signal, the sub-period between two adjacent extrapolated crankshaft positions can be determined, based on the calculated $(i+1)^{th}$ predicted period, the position values at the current rising edge ($i^{th}$), and the maximum extrapolated position (which is determined by the crankshaft position tracking resolution) before the next rising edge ($(i+1)^{th}$) of the crankshaft signal, read from look-up table 202 as below:

$$SubPeriod_i = \frac{PredictedPeriod_{i+1}}{EPos_i - Pos_i + 1} \quad (5)$$

At each rising edge of the crankshaft signal, a clock timer is cleared and started to count the time in clock ticks. The extrapolated crankshaft position counter is increased by one each time the clock timer value equals to the multiple of the calculated sub-period value. Thus, the position counter can track the crankshaft position in real-time according to the extrapolation resolution.

For some crankshaft tooth wheel patterns, the numerators and denominators of the exact factor values in integer format could become very big. For example, if $\theta_i = 10°$ and $\theta_{i+1} = 9.1°$, $$Fac_i = \frac{\theta_{i+1}}{\theta_i} = 0.91 = \frac{91}{100}.$$

The numerator, 91, and the denominator, $100_{10} = 1100100_2$, are to be stored in the look-up table 202, which requires 7 bits for each value.

To save memory space and reduce computational effort, the bit-widths for the numerator and denominator in the look-up table are determined by the desired position tracking resolution. For the above example, if the desired tracking resolution is larger than 0.1°, the factor value can be set as $Fac_1 = 0.91 \approx 0.9 = 9/10$, which requires only 4 bits ($10_{10} = 1010_2$) for the numerator and denominator.

Example; Cam and Crankshaft Position Sensor Signals

Figure 4A:
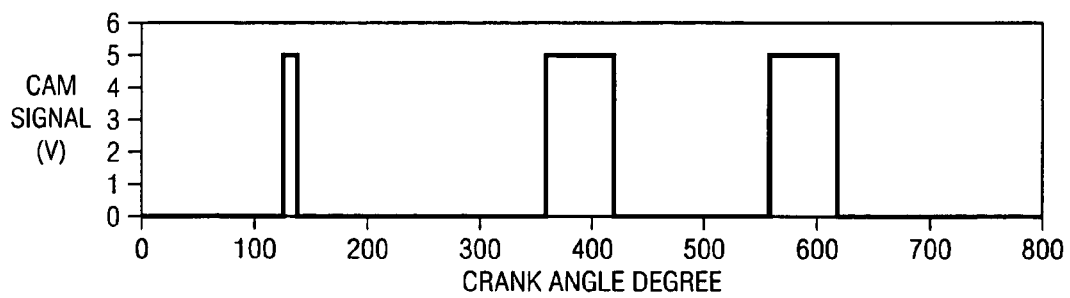

FIGS. 4A–4C illustrate examples of cam and crankshaft position sensor signal patterns. These example signals are used below to illustrate the operation of system 100.

As shown in FIG. 4A, during one complete engine cycle (720° crankshaft angle degrees), the cam signal from sensor 102 has three pulses. Of these three pulses, two have the same pulse width and one has a narrower pulse width.

As shown in FIG. 4B, the crankshaft position tooth wheel has one tooth every 6 crankshaft angle degrees but has 3 missing teeth. Therefore, the crankshaft signal from sensor 103 has one pulse every 6 crankshaft angle degrees but has 3 adjacent missing pulses. In other words, the crankshaft position sensor 103 gives 60−3=57 pulse signals every one crankshaft revolution (360° crankshaft angle). Among them, there are 6 crankshaft angle degrees between all the adjacent rising edges except for the two adjacent rising edges between missing teeth, which is 24 crankshaft angle degrees.

FIG. 4C is a more detailed view of FIG. 4A superimposed with FIG. 4B. There are 2 crankshaft signal rising edges between the rising edge and the falling edge of the first cam signal, 10 crankshaft signal rising edges between the rising edge and the falling edge of the second cam signal, and 7 crankshaft signal rising edges between the rising edge and the falling edge of the third cam signal.

Example; Crankshaft Position Recognition

According to the crankshaft position recognition method of module 104a, once engine 101 is rotated by the starter, and, at the first detected falling edge (after the first detected rising edge) of the cam signal, the value of the "crankshaft counter" (2, 10, or 7) can be used to locate the corresponding crankshaft position at the following rising edge of the crankshaft signal.

At the first falling edge of the cam signal:

1) if the value of the crankshaft counter is 2, then the position pointer register is set to 23, which corresponds the crankshaft position of 138° crankshaft angle degrees as stored in the look-up table for the following rising edge of the crankshaft signal;

2) if the value of the crankshaft counter is 10, then the position pointer register is set as 70, which corresponds the crankshaft position of 420° crankshaft angle degrees as stored in the look-up table for the following rising edge of the crankshaft signal;

3) if the value of the crankshaft counter is 7, then the position pointer register is set as 103, which corresponds the crankshaft position of 618° crankshaft angle degrees as stored in the look-up table for the following rising edge of the crankshaft signal.

In this manner, the crankshaft position can be recognized once the first pair of rising and falling edges of the cam signal is detected. For this example, because there are three cam signal pulses per engine cycle, the crankshaft position can be recognized in less than one engine cycle (less than 720 crankshaft angle degrees) once the crankshaft is rotated by the starter.

Crankshaft Position Tracking

Once module 104a recognizes the engine crankshaft position, the crankshaft position pointer is initialized. It is then increased by one at each rising edge of the crankshaft position sensor signal. The crankshaft position tracking algorithm is used to track the crankshaft position.

If the crankshaft position tracking extrapolation resolution is set as 6/16=0.375°, the tracking algorithm needs to extrapolate 15 crankshaft positions between two adjacent rising edges of the crankshaft signal (6°), and 23 crankshaft positions between the rising edges around the missing teeth.

FIG. 5 illustrates partial contents of look-up table 202 around the missing teeth, as generated by the position tracking module 104b. The values of the columns at other regular pulses of the crankshaft signal are straightforward and are not shown. Because pulses of the crankshaft signal are equally distributed at most locations except at the missing teeth, the factor values are mostly 1 except at the crankshaft signal rising edges around the missing teeth.

Because the tracking resolution is 0.375°, the position values in the table are from 0/0.375=0 to (720−0.375)/0.375=1919. The position value from the table times the resolution will be the actual crankshaft position in crankshaft angle domain.

For purposes of illustration, FIG. 5 also sets out the actual crankshaft angle degree positions. However, these values need not be stored in the actual look-up table 202.

Once look-up table 202 is built, the position tracking module 104b may be used to track the engine crankshaft position in real-time and to provide the engine crankshaft position information for all the position-synchronized functions (such as injections and ignitions). Once built, look-up table 202 can be easily modified to reflect values for any other arbitrary cam or crankshaft signal pattern.

What is claimed is:

1. A method of recognizing the crankshaft position of an engine, wherein the engine provides a pulse-type cam signal and a pulse-type crankshaft signal, comprising:
   assigning a position value corresponding to each rising edge of the crankshaft signal;
   wherein
   each position value represents the crankshaft position in angle degrees around a cycle of the crankshaft;
   storing values representing, for each pulse of the cam signal within a cam cycle, the number of crankshaft pulses within that cam pulse and an associated initial crankshaft position value;
   at a detected rising edge of the cam signal, clearing and initializing a crankshaft counter;
   increasing the crankshaft counter by one for each rising edge of the crankshaft signal, until the falling edge of the cam signal is detected;
   at the falling edge of the cam signal, accessing the stored values; and
   based on the value of the crankshaft counter, selecting the associated initial crankshaft position value.

2. The method of claim 1, wherein the rising edges of the cam signal and the crankshaft signal occur at the same time, and further comprising the step of delaying one of the signals.

3. A crankshaft position recognition unit for recognizing the crankshaft position of an engine, wherein the engine provides a pulse-type cam signal and a pulse-type crankshaft signal, comprising:
   memory for storing a position value corresponding to each rising edge of the crankshaft signal;
   wherein each position value represents the crankshaft position in angle degrees around a cycle of the crankshaft;
   memory for storing values representing, for each pulse of the cam signal within a cam cycle, the number of crankshaft pulses within that cam pulse and an associated initial crankshaft position value;
   a crankshaft counter, wherein at a detected rising edge of the cam signal, the counter is cleared and initialized;
   the crankshaft counter further operable to increment by one for each rising edge of the crankshaft signal, until the falling edge of the cam signal is detected;
   a processor for accessing the stored values at the falling edge of the cam signal, accessing the stored values, and based on the value of the crankshaft counter, selecting the associated initial crankshaft position value.

4. The recognition unit of claim 3, wherein the processor is implemented with firmware.

5. The recognition unit of claim 3, wherein the processor is implemented with a software programmable device.

6. The recognition unit of claim 3, wherein the rising edges of the cam signal and the crankshaft signal occur at the same time, and wherein the counter is delayed to make them occur at different times.

7. A method of providing, to a crankshaft position calculating unit, tracking data for determining the position of the crankshaft of an engine, the crankshaft having an associated pulse-type crankshaft signal, comprising:
   storing, in a data memory, for each rising edge of the crankshaft signal, a position value representing the crankshaft position at that rising edge and an extrapolation factor value;
   wherein the position value times a degree angle resolution provides the crankshaft position in degree angle domain;
   obtaining a current position value of the crankshaft;
   using the current position value to initialize a position pointer;
   wherein the position pointer is a count of the crankshaft signal rising edges per engine cycle;
   incrementing the position pointer for each rising edge of the crankshaft signal;
   using values of the position pointer to access the corresponding location in the memory; and
   delivering, to the crankshaft position processing unit, for at least one rising each, the associated position value and extrapolation factor value.

8. The method of claim 7, wherein the data memory is a look-up table.

9. The method of claim 7, wherein each extrapolation factor value is a ratio between the degree period of the previous rising edge relative to the current rising edge and of the next rising edge relative to the current rising edge.

10. The method of claim 9, wherein each degree period is determined by the mechanical pattern of a crankshaft signal trigger tooth wheel of the engine.

11. The method of claim 9, wherein the data memory separately stores a numerator and denominator of the ratio.

12. The method of claim 9, wherein the data memory further stores a maximum extrapolation value.

13. A crankshaft position tracking unit for providing, to a crankshaft position calculating unit, tracking data for determining the position of the crankshaft of an engine, the crankshaft having an associated pulse-type crankshaft signal, comprising:
- a data memory, for storing, at each rising edge of the crankshaft signal, a position value representing the crankshaft position at that rising edge and an extrapolation factor value; wherein the position value times a degree angle resolution provides the crankshaft position in degree angle domain;
- a processor for obtaining a current position value of the crankshaft; using the current position value to initialize a position pointer; wherein the position pointer is a count of the crankshaft signal rising edges per engine cycle; incrementing the position pointer for each rising edge of the crankshaft signal; using values of the position pointer to access the corresponding location in the memory; and delivering, to the crankshaft position processing unit, a position value and an extrapolation factor value associated with at least one rising edge.

14. The tracking unit of claim 13, wherein the processor is implemented with firmware.

15. The tracking unit of claim 13, wherein the processor is implemented with a software programmable device.

16. A method of providing data representing the degree angle position of the crankshaft of an engine, the crankshaft having an associated pulse-type crankshaft signal, comprising:
- receiving, at a crankshaft position calculating unit, the following data associated with a rising edge of the crankshaft signal: a position value representing the crankshaft position at the rising edge, an extrapolation factor value, and a maximum extrapolation value;
- wherein the position value times a degree angle resolution provides the crankshaft position in degree angle domain;
- detecting rising edges of the crankshaft signal;
- at a current rising edge of the crankshaft signal, calculating an extrapolated position of the crankshaft, based on the following values: a calculated predicted period to the next rising edge, the maximum extrapolation value, and a position value; and
- wherein the calculated predicted period is based on at least the previous period to the current rising edge in angle degree distance and its associated factor value.

17. The method of claim 16, wherein the degree angle resolution is not equal to one, further comprising multiplying the degree angle resolution times the position value.

18. The method of claim 16, wherein the engine is in transient state and the predicted period is based on a number of previous period values, each having an associated factor value and a mathematically determined coefficient value.

19. An engine crankshaft position calculating unit for calculating an extrapolated crankshaft position of an engine that has a crankshaft and that generates a pulse-type crankshaft signal, comprising:
- memory for storing the following data associated with each rising edge of the crankshaft signal: a position value representing the crankshaft position at the rising edge, an extrapolation factor value, and a maximum extrapolation value;
- wherein the position value times a degree angle resolution provides the crankshaft position in degree angle domain; and
- a processor for receiving data representing rising edges of the crankshaft signal, and for calculating, at a current rising edge of the crankshaft signal, an extrapolated position of the crankshaft, based on the following values: a calculated predicted period to the next rising edge, the maximum extrapolation value, and a position value;
- wherein the calculated predicted period is based on at least the previous period to the current rising edge in angle degree distance and its associated factor value.

20. The calculating unit of claim 19, wherein at least part of the tasks of the processor are integrated into an engine control unit associated with the engine.

* * * * *